(12) United States Patent
Morito et al.

(10) Patent No.: US 12,348,155 B2
(45) Date of Patent: Jul. 1, 2025

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Chikara Morito, Tokyo (JP); Shunsuke Tobayashi, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 0 days.

(21) Appl. No.: 18/042,895

(22) PCT Filed: Jul. 14, 2021

(86) PCT No.: PCT/JP2021/026406
§ 371 (c)(1),
(2) Date: Feb. 24, 2023

(87) PCT Pub. No.: WO2023/286189
PCT Pub. Date: Jan. 19, 2023

(65) Prior Publication Data
US 2024/0136941 A1 Apr. 25, 2024

(51) Int. Cl.
*H02M 7/48* (2007.01)
*H02M 1/00* (2006.01)
*H02M 1/36* (2007.01)

(52) U.S. Cl.
CPC ........... *H02M 7/48* (2013.01); *H02M 1/0003* (2021.05); *H02M 1/36* (2013.01)

(58) Field of Classification Search
CPC ............ H02M 1/0003; H02M 1/0006; H02M 1/0016; H02M 1/0038; H02M 1/0048;
(Continued)

(56) References Cited

U.S. PATENT DOCUMENTS

| 2014/0055059 A1* | 2/2014 | Uryu | H02P 27/06 318/9 |
| 2021/0135597 A1* | 5/2021 | Hario | H02M 7/48 |
| 2021/0170884 A1* | 6/2021 | Sakakibara | B60L 50/60 |

FOREIGN PATENT DOCUMENTS

JP 2020-14321 A 1/2020

* cited by examiner

*Primary Examiner* — Nguyen Tran
(74) *Attorney, Agent, or Firm* — Oblon, McClelland, Maier & Neustadt, L.L.P.

(57) ABSTRACT

A power conversion device includes a first relay unit, one or more second relay units, and a safety control unit. The first relay unit includes a first logic processing unit that transmits a response signal supplied from a first power conversion unit and a response signal of a downstream side of its first relay unit to an upstream side. Each of the one or more second relay units includes a second logic processing unit that transmits a response signal transmitted from one second power conversion unit among the one or more second power conversion units and a response signal transmitted from a downstream side of the one second relay unit to an upstream side of the one second relay unit. The safety control unit is disposed on an upstream side of the first logic processing unit and configured to perform functional safety control of the first power conversion unit and the one or more second power conversion units by transmitting a control command for functional safety control to the first relay unit and thus monitor a state of the functional safety control of the first (Continued)

power conversion unit and states of the functional safety control of the one or more second power conversion units.

13 Claims, 9 Drawing Sheets

(58) Field of Classification Search
CPC ...... H02M 7/48; H02M 7/4803; H02M 7/483; H02M 7/42
See application file for complete search history.

FIG. 5

| W | X | Y | Z | SOUT |
|---|---|---|---|---|
| H | H | L | H | H AT TIME OF B-bank |
| L | H | L | H | H AT TIME OF C-bank |
| L | H | L | L | H AT TIME OF D-bank |

FIG. 6

| W | Z | SOUT |
|---|---|---|
| H | H | H AT TIME OF B-bank |
| L | H | H AT TIME OF C-bank |
| L | L | H AT TIME OF D-bank |

POWER CONVERSION DEVICE

TECHNICAL FIELD

An embodiment of the present invention relates to a power conversion device.

BACKGROUND ART

There are power conversion devices that improve availability by redundantly configuring a plurality of power conversion units (main circuits) having switching devices. Functional safety control is to reduce a risk that may occur during an operation of a system. For example, by applying the functional safety control to a power conversion device, the power conversion device can be prevented from operating in an unstable state by stopping output of electric power from the power conversion device in accordance with an occurring risk. The configuration and the scale of a power conversion device are determined in accordance with specifications requested by a user, and thus there is a demand for a power conversion device to be able to respond to various configurations and scales. As the configuration becomes more complex, and as the scale becomes larger, a configuration for the functional safety control of the plurality of power conversion units becomes more complex, and there are cases in which it is difficult to collect information representing a state of the functional safety control.

CITATION LIST

Patent Document

[Patent Document 1]
Japanese Unexamined Patent Application, First Publication No. 2020-014321

SUMMARY OF INVENTION

Technical Problem

An object to be achieved by the present invention is to provide a power conversion device capable of collecting information representing a state of functional safety control of a plurality of power conversion units that are redundantly configured using a simple and easy configuration.

Solution to Problem

According to one aspect of an embodiment, there is provided a power conversion device in which a plurality of power conversion units are configured to be divided into a plurality of banks, and operation states of the power conversion units are controlled in units of the banks. The power conversion device includes a first relay unit, one or more second relay units, and a safety control unit. The first relay unit is configured to transmit a response signal supplied from a first power conversion unit and a response signal of a downstream side of its own first relay unit to an upstream side in a first bank associated with the first power conversion unit. The one or more second relay units are configured to transmit a response signal supplied from one second power conversion unit among one or more second power conversion units and a response signal of a downstream side of the one second relay unit to an upstream side of the one second relay unit in one or more second banks associated with the one or more second power conversion units. The safety control unit is disposed on an upstream side of the first relay unit and configured to perform functional safety control of the first power conversion unit and functional safety control of the one or more second power conversion units by transmitting a command signal including a control command for functional safety control to the first relay unit and thus monitor a state of the functional safety control of the first power conversion unit and states of the functional safety control of the one or more second power conversion units.

BRIEF DESCRIPTION OF DRAWINGS

FIG. 5 is a diagram illustrating selection of a bank according to an embodiment.

FIG. 6 is a diagram illustrating selection of a bank according to an embodiment.

DESCRIPTION OF EMBODIMENTS

Hereinafter, a power conversion device according to an embodiment will be described with reference to the drawings. In the following description, the same reference signs are assigned to components having the same function or similar functions. Duplicate description of such components may be omitted. Being electrically connected may be simply referred to as "being connected". A safety control unit monitors a state of functional safety control (referred to as a safety control state) of a power conversion unit that is a monitoring target. The safety control unit side will be referred to as an upstream side, and a side away from the safety control unit will be referred to as a downstream side.

In a power conversion device 1 illustrated in an embodiment, a main circuit is redundantly configured such that it can be applied to a system having a relatively high demand for availability. As an example of redundancy, a case in which one or both of standby redundancy and capacity redundancy are applied will be described. The standby redundancy is a method in which, when a power conversion unit 10 of a specific bank that is set as a currently-used system is out of order in a power conversion device 1 having a configuration including a plurality of banks, a power conversion unit 10 of a bank that is set as a standby system is switched to the currently-used system, and the operation of the power conversion device 1 continues. Here, a configuration in which one bank is set as a standby system will be illustrated. The capacity redundancy is a method of continuing the operation in which a suppliable capacity is configured to have a margin for a required capacity of an AC electric power, and, even when a malfunctioning part has been isolated, the operation continues using a remaining configuration, and a necessary capacity is secured.

First Embodiment

Figure 1A:
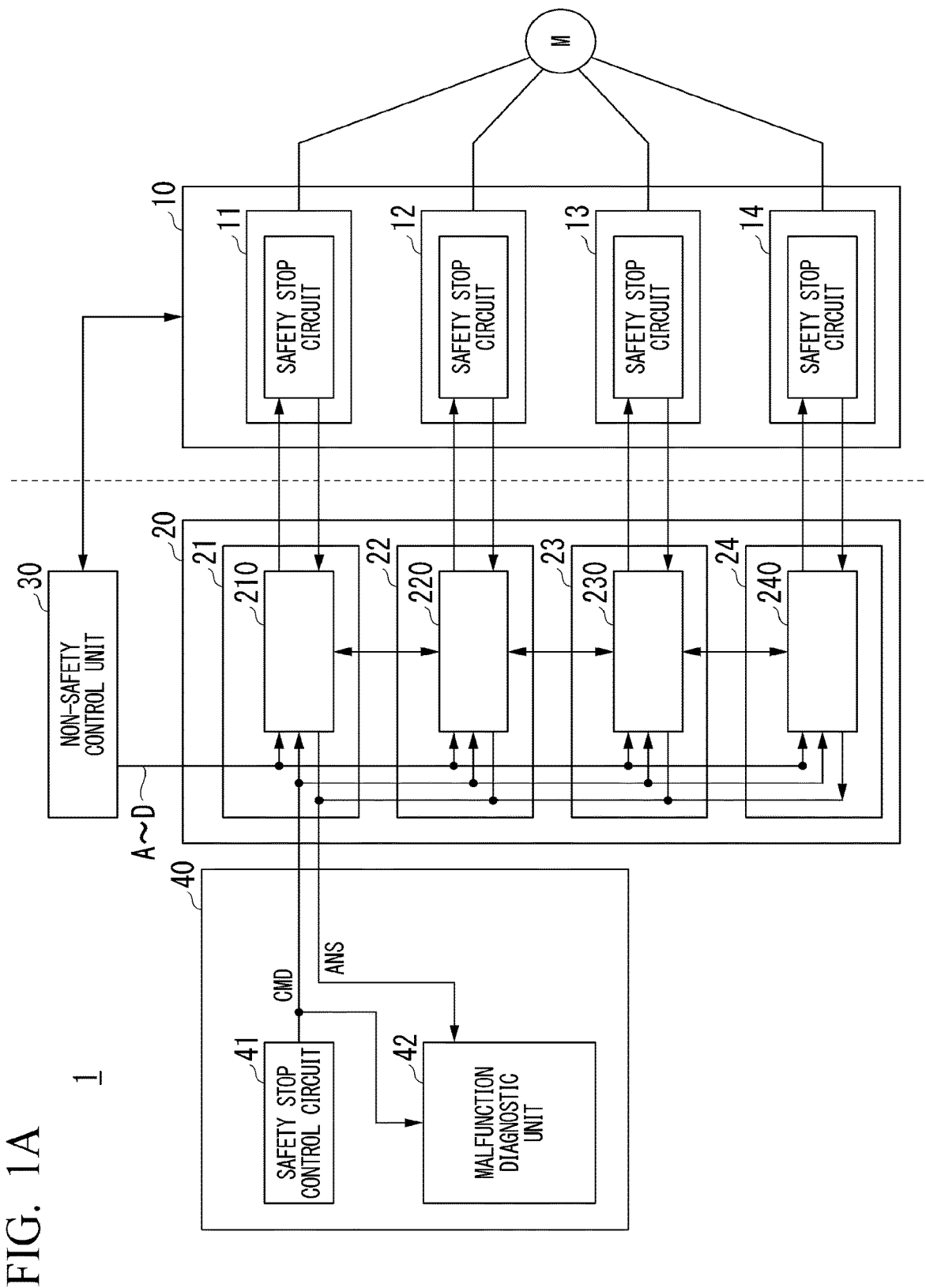
FIG. 1A is a schematic configuration diagram of a power conversion device according to an embodiment.
Figure 1B:
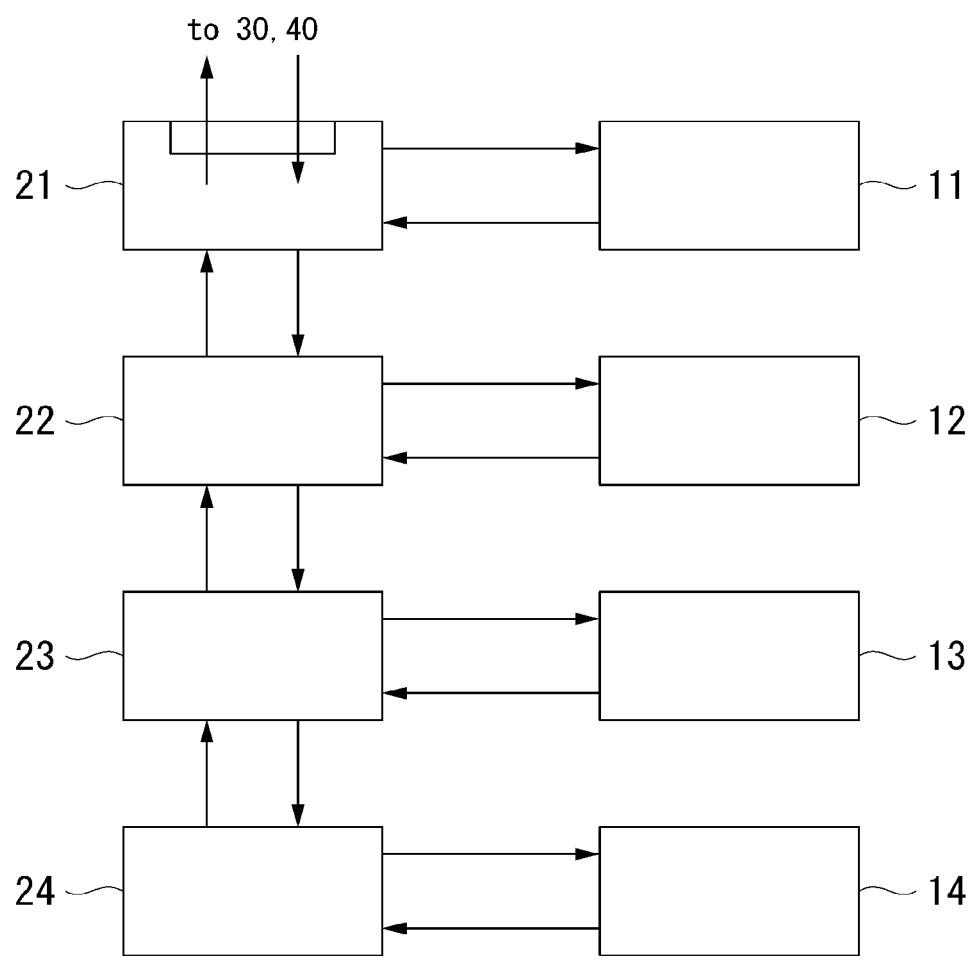
FIG. 1B is a schematic configuration diagram relating to safety control of the power conversion device according to the embodiment.

FIG. 1A is a schematic configuration diagram of a power conversion device 1 according to an embodiment. FIG. 1B is a schematic configuration diagram relating to safety control of the power conversion device 1 according to the embodiment.

The power conversion device 1 illustrated in FIG. 1A, for example, includes power conversion units 11 to 14, a relay unit group 20, a non-safety control unit 30 (a non-safety control part), and a safety control unit 40 (a safety control part).

Each of the power conversion units 11 to 14, for example, includes one or a plurality of switching devices not illustrated in the drawing and converts an electric power using switching thereof. A type of the switching devices may be an insulated gate bipolar transistor (IGBT), an injection enhanced gate transistor (IBGT), a metal-oxide-semiconductor field-effect transistor (MOSFET), or the like. The power conversion unit 11 is one example of a first power conversion unit. The power conversion units 12 to 14 are examples of one or more second power conversion units. Hereinafter, when the power conversion units 11 to 14 that are examples of a plurality of power conversion units are indicated collectively without being distinguished from each other, they may be simply referred to as power conversion units 10. The power conversion unit 10 functions as an inverter generating an AC power through control and causes a current to flow through a winding of a motor M connected to an output thereof.

The power conversion units 10 are configured to be divided into a plurality of banks. For example, the power conversion device 1 controls operation states of the power conversion units 10 in units of banks. For example, the power conversion device 1 performs switching of redundancy control in units of banks. As the number of banks of the power conversion device 1, for example, any of 1 to 4 can be selected. For example, the number of banks is determined in accordance with a requirement specification of the power conversion device 1. In the following description, a case in which the number of banks of a maximum bank configuration according to the embodiment is set to four will be described as an example.

The relay unit group 20 is configured to be divided in accordance with a bank configuration and, for example, includes relay units 21 to 24. For example, the relay unit 21 is associated with a first bank together with the power conversion unit 11. The relay unit 22 is associated with a second bank together with the power conversion unit 12. The relay unit 23 is associated with a third bank together with the power conversion unit 13. The relay unit 24 is associated with a fourth bank together with the power conversion unit 14.

The relay unit 21 is an example of a first relay unit. In addition, the relay units 22 to 24 correspond to three second relay units and are examples of one or more second relay units. In this way, on the downstream side of the relay unit group 20, the power conversion units 10 are disposed. On the upstream side of the relay unit group 20, the non-safety control unit 30 and the safety control unit 40 are disposed. At least the safety control unit 40 is disposed on the upstream side of the relay unit group 20. The relay unit group 20 relays control from the non-safety control unit 30 and the safety control unit 40 for each power conversion unit 10. The relay unit group 20 relays a state of each power conversion unit 10 to the non-safety control unit 30 and the safety control unit 40.

For example, the non-safety control unit 30 performs capacity redundancy control of each power conversion unit and standby redundancy control of each power conversion unit 10. In case of the capacity redundancy control, the non-safety control unit 30 performs a redundancy operation of adjusting an amount of power conversion in the power conversion unit 11 and the power conversion units 12 to 14. In case of the standby redundancy control, by outputting use setting signals A to D corresponding to the power conversion unit 10 to be operated, the non-safety control unit 30 selects a power conversion unit to be activated from among the power conversion unit 11 and the power conversion units 12 to 14. The power conversion unit 10 selected in accordance with this performs power conversion as a currently-used system, and the power conversion units 10 that have not been selected become standby systems not performing power conversion.

The safety control unit 40 performs functional safety control of each power conversion unit 10, thereby reducing risks that may occur during the operation of each power conversion unit 10. The safety control unit 40 generates an operation command CMD and controls an output state of each power conversion unit 10 using the operation command CMD. The safety control unit 40 receives a response signal ANS from each power conversion unit 10 and monitors an operation state of functional safety control for the operation command CMD.

In the power conversion device 1 configured in this way, an operation state of each power conversion unit 10 is determined in accordance with control from the non-safety control unit 30 and the safety control unit 40. Switching control of switching devices included in each power conversion unit 10 is determined in accordance with control from the non-safety control unit 30. In addition, an output of each power conversion unit 10 may be restricted in accordance with control from the safety control unit 40. By causing a plurality of power conversion units 10, which are redundantly configured, to function in combination, the power conversion device 1 converts an electric power of a desired amount, thereby driving the motor M.

Hereinafter, more detailed description of each unit arranged inside the power conversion device 1 will be presented in order.

The power conversion unit 10 according to the embodiment will be described with reference to FIGS. 2A and 2B.

Figure 2A:
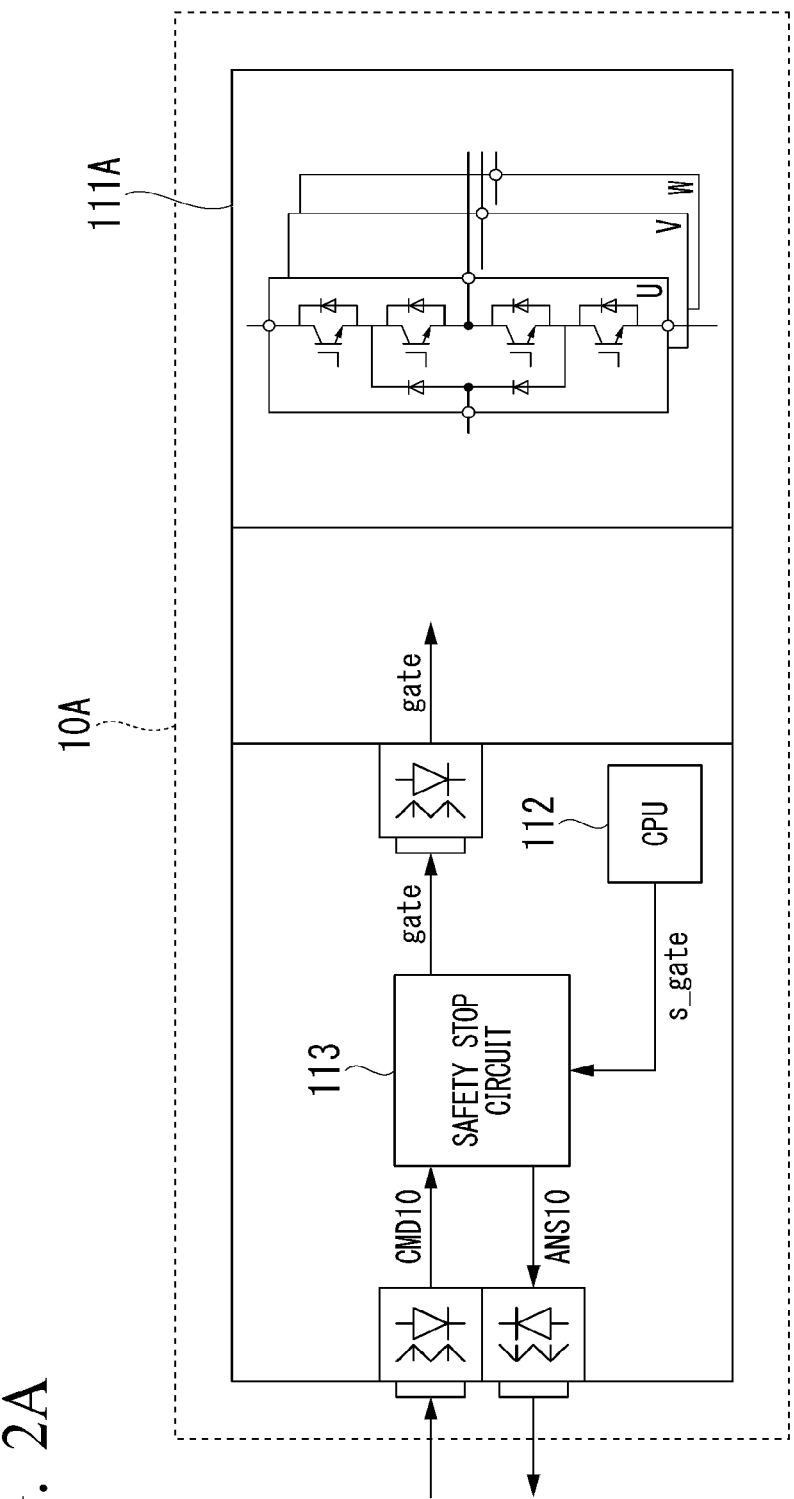
FIG. 2A is a configuration diagram of a power conversion unit of a first example of the embodiment.
Figure 2B:
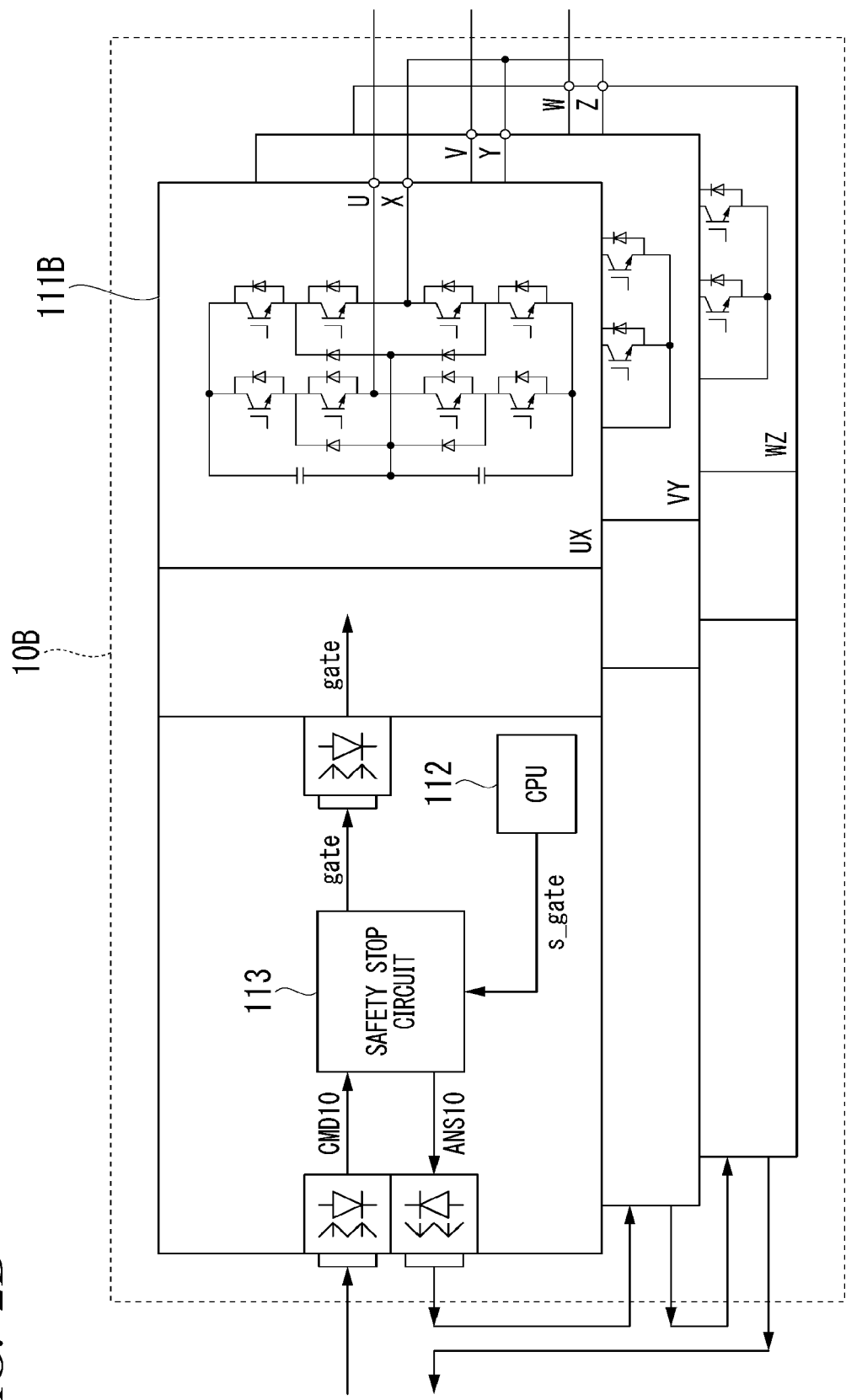
FIG. 2B is a configuration diagram of a power conversion unit of a second embodiment of the embodiment.

FIG. 2A is a configuration diagram of a power conversion unit 10A according to an embodiment. The power conversion unit 10A is an example of a three-level type inverter that generates a three-phase AC power. FIG. 2B is a configuration diagram of a power conversion unit 10B according to an embodiment. The power conversion unit 10B is an example of a five-level type inverter that generates a three-phase AC power. The power conversion unit 10A and the power conversion unit 10B are examples of the power conversion unit 10. Hereinafter, the power conversion unit 10A and the power conversion unit 10B will be described in order.

The power conversion unit 10A illustrated in FIG. 2A includes a main circuit unit 111A, a main circuit control unit 112, and a safety stop circuit 113. In addition to those described above, for example, an interface unit that electrically insulates a space between the main circuit unit 111A and the safety stop circuit 113 and a space between the safety stop circuit 113 and the relay unit group 20 is appropriately disposed. In the following description, for simplification of the description, description of the interface unit described above will be omitted.

The main circuit unit 111A includes one leg of a neutral-point-crumped (NPC) type including one or a plurality of switching devices for each phase of a three-phase AC. In the main circuit unit 111A, switching of one or a plurality of switching devices is controlled in accordance with a gate pulse (gate) to be described below. In a case in which driving of the main circuit unit is not restricted by the safety stop circuit 113 to be described below, when supply of a gate pulse (gate) is received, and driving thereof is restricted by the safety stop circuit 113, the supply of the gate pulse (gate) stops. The configuration of the main circuit unit 111A illustrated in FIG. 2A is an example of a three-level type but is not limited thereto, may be a configuration of a type other than the three-level type and, for example, may be a two-level type.

The main circuit control unit 112 generates a gate pulse (s_gate) used for switching one or a plurality of switching devices on the basis of control from the non-safety control unit 30 and detection results acquired by various sensors not illustrated in the drawing or estimated results of control states. In a control command from the non-safety control unit 30, for example, a control command representing reference values of position control, speed control, torque control, and the like is included. In addition, a control command from the non-safety control unit 30 to the main circuit control unit 112 may be directly supplied to the main circuit control unit 112 without going through the relay unit group 20.

The safety stop circuit 113 is connected to an output of the main circuit control unit 112 and receives supply of a gate pulse (s_gate) from the main circuit control unit 112. In a case in which a predetermined condition is satisfied, by supplying a gate pulse (gate) corresponding to the gate pulse (s_gate) to the main circuit unit 111A, the safety stop circuit 113 activates the main circuit unit 111A to perform power conversion. In addition, in a case in which a predetermined condition is not satisfied, the safety stop circuit 113 restricts supply of the gate pulse to the main circuit unit 111A.

The safety stop circuit 113 is formed to be connected to one of the relay units 21 to 24 to be described below. For example, the safety stop circuit 113 of the power conversion unit 11 receives control from the safety control unit 40 through the relay unit 21. For example, the safety stop circuit 113 receives an operation command CMD through the relay unit 21 and transmits a response signal ANS to the safety control unit in response to this. In FIG. 2A, the operation command CMD and the response signal ANS are respectively represented as CMD10 and ANS10.

The description presented above is a description about the power conversion unit 10A illustrated in FIG. 2A. In contrast to this, the power conversion unit 10B illustrated in FIG. 2B includes a main circuit unit 111B in place of the main circuit unit 111A of the power conversion unit 10A. Description will be focused on differences therebetween.

The main circuit unit 111B includes two legs of a neutral-point-trumped (MPC) type each including one or a plurality of switching devices for each phase of a three-phase AC. The configuration of the main circuit unit 111B illustrated in FIG. 2B is an example of a five-level type but is not limited thereto.

In each phase described above, an output of a first leg is connected to the winding of the motor M, and an output of a second leg is connected to a neural point of an AC system. For example, a U phase includes a leg U and a leg X, a V phase includes a leg V and a leg Y, and a W phase includes a leg W and a leg Z. Outputs of the leg U, the leg V, and the leg W are connected to windings of UVW phases of the motor M, and outputs of the leg X, the leg Y, and the leg Z are connected to the neutral point of the AC system.

As described above, although the configurations of main circuits of the power conversion unit 10A and the power conversion unit 10B are different from each other, similar control may be applied thereto in functional safety control.

In addition, in a case in which outputs of the power conversion units 10 are connected to one end of a specific winding of the motor M together, transient generation of an excessive current may be inhibited by disposing a reactor between the output of each power conversion unit 10 and the one end of the specific winding of the motor M. The description presented above represents a main connection, and, as described above, a reactor may be included in each connection. In FIGS. 1A, 2A, 2B, and the like, denotation of the reactor described above is omitted. In addition, in a part in which the reactor is not necessary unlike the description presented above, the reactor may be omitted as illustrated in the drawings described above. In a case in which the reactor is disposed, a general configuration for the purpose of protection from an excessive current described above and the like may be applied.

When an operation command CMD of "output stop" is received from each safety control unit 40 through the relay unit group 20, each power conversion unit 10 is controlled to stop the output of the AC power using the safety stop circuit 113. In accordance with this, each power conversion unit 10 stops supply of the AC power. In accordance with this, the supply of the AC power for the winding of the motor M stops.

Next, the relay unit group 20 will be described with reference to FIGS. 1A and 1B.

The relay unit 21 includes a first logic processing unit 210 that transmits a response signal ANS transmitted from the power conversion unit 11 and a response signal ANS transmitted from a downstream side of the relay unit 21 to an upstream side. The relay unit 22 includes a second logic processing unit 220 that transmits a response signal ANS transmitted from the power conversion unit 12 and a response signal ANS transmitted from a downstream side of the relay unit 22 to an upstream side. The relay unit 23 includes a second logic processing unit 230 that transmits a response signal ANS transmitted from the power conversion unit 13 and a response signal ANS transmitted from a downstream side of the relay unit 23 to an upstream side. The relay unit 24 includes a second logic processing unit 240 that transmits a response signal ANS transmitted from the power conversion unit 14 and a response signal ANS transmitted from a downstream side of the relay unit 24 to an upstream side. In addition, a similar relay unit is not disposed on the downstream side of the relay unit 24, and thus a response signal ANS is not supplied to the second logic processing unit 240 from the downstream side.

In this way, each of the relay units 21 to 24 is associated with each power conversion units 10 and is configured to transmit a response signal ANS transmitted from each power conversion unit 10 and a response signal ANS transmitted from the downstream side of the relay unit to the upstream side.

The non-safety control unit 30 generates the use setting signals A to D used for designating respective power conversion units 10 to operate in the power conversion device 1 and supplies the generated use setting signals to the relay units 21 to 24. The use setting signals A to D include information used for instructing the power conversion unit 10 to operate.

The safety control unit 40 is disposed on the upstream side of the relay unit 21 and is connected to the relay unit 21. In other words, the safety control unit 40 is disposed on the upstream side of the relay units 21 to 24. The safety control unit 40, the relay unit 21, and the relay units 22 to 24 are defined as the upstream side of the safety control unit 40, and a connection order based on the order of description is defined. The safety control unit 40, the relay unit 21, and the relay units 22 to 24 are electrically connected to each other in the connection order described above.

The safety control unit 40 monitors a state of functional safety control of at least each power conversion unit 10. The safety control unit 40 may transmit an operation command CMD to each power conversion unit 10 and control each power conversion unit 10.

For example, the safety control unit 40 includes a safety stop control circuit 41 and a malfunction diagnostic unit 42. The safety stop control circuit 41 transmits an operation command CMD to each power conversion unit 10 and collects and controls a state of safety stop control of each power conversion unit 10. For example, the operation command CMD output by the safety stop control circuit 41 is a signal for validating functional safety control of each power conversion unit 10 and operating the functional safety control. In a case in which the functional safety control is to be validated, for example, the safety stop control circuit 41 outputs a signal of a H level as an operation command CMD.

Each power conversion unit 10 outputs a response signal ANS10 in response to a safety control signal CMD10 for this operation command CMD. Each of the relay units 21 to 24 relays this response signal ANS10 and notifies the safety control unit 40 thereof. The safety control unit 40 receives a response signal ANS corresponding to this response signal ANS10 as a signal representing the safety control state of each power conversion unit 10. Safety control signals CMD11 to CMD14 to be described below are examples of the safety control signal CMD10. Response signals ANS11 to ANS14 to be described below are examples of the response signal ANS10.

In a case in which a logic of the operation command CMD transmitted by the safety control unit 40 corresponds to a logic of the response signal ANS described above, the malfunction diagnostic unit 42 determines that the functional safety control of the power conversion device 1 effectively functions. Details thereof will be described below.

Next, types of relay units included in the power conversion device 1 will be described.

The power conversion device 1 that is redundantly configured is formed to include two types of relay units regardless of the number of banks. For this reason, in case of a configuration having three banks or more, the power conversion device 1 uses a plurality of relay units of the same type. A plurality of relay units of the same type applied to this embodiment are identified using a method using hardware for identifying one of the plurality of relay units of the same type without using a user's switching operation, setting of a flag using software, and the like.

Identification of relay units will be described.

In the configuration of three banks or more as described above, a plurality of relay units of the same type configured using common hardware are used. In this case, it is necessary to identify each relay unit. The power conversion device 1 according to this embodiment, for example, as below, identifies each relay unit configured using common hardware on the basis of a mounting position thereof. Hereinafter, a configuration example for each number of banks will be described.

In case of 2-bank configuration:

In case of the 2-bank configuration, a relay unit of one format A (referred to as "unit A") and a relay unit of one format B (referred to as "unit B") are included. In addition, in case of this 2-bank configuration, there is only one relay unit of each type, and thus there is no relay units of the same type.

A connection form of this configuration is schematically represented and is illustrated in the following Equation (1). A first term is a first bank (referred to as an A-bank), and a second term is a second bank (referred to as a B-bank). A sign "+" represents connection. Hereinafter, the sign represents a similar meaning $$(\text{unit } A) + (\text{unit } B) \tag{1}$$

In each of the A-bank and the B-bank read from the relation of Equation (1) represented above, assignment of a format for this and features of a connection state thereof are arranged in the following Equation (2).

$A$-bank: unit $A$ $B$-bank: unit $B$ connected to unit $A$ \hfill (2)

In Case of 3-Bank Configuration:

In case of the 3-bank configuration, one unit A and two units B are included. A connection form of this configuration is schematically represented and is illustrated in the following Equation (3). A third term is a referred to as a third bank (referred to a C bank).

$$(\text{unit } A) + \text{first}(\text{unit } B) + \text{second}(\text{unit } B) \tag{3}$$

In each of the A-bank to the C-bank read from the relation of Equation (3) represented above, assignment of a format for this and features of a connection state thereof are arranged in the following Equation (4).

$A$-bank: unit $A$ $B$-bank: first unit $B$ connected to unit a and second unit $B$ $C$-bank: second unit$B$ connected to first unit$B$ \hfill (4)

In case of 4-bank configuration, one unit A and three units B are included.

A connection form of this configuration is schematically represented and is illustrated in the following Equation (5). A fourth term is a referred to as a fourth bank (referred to a D-bank).

$$(\text{unit } A) + \text{first}(\text{unit } B) + \text{second}(\text{unit } B) + \text{third}(\text{unit } B) \tag{5}$$

$A$-bank: unit $A$ $B$-bank: first unit $B$ connected to unit a and second unit $B$ $C$-bank: second unit $B$ connected to first unit $b$ and third unit $B$ $D$-bank: third unit $B$ connected to second unit $B$ \hfill (6)

As described above, also in the configuration in which a plurality of relay units of the same type are included, a bank assigned to each thereof can be identified using identification based on information of a mutual connection relation between relay units.

Figure 3A:
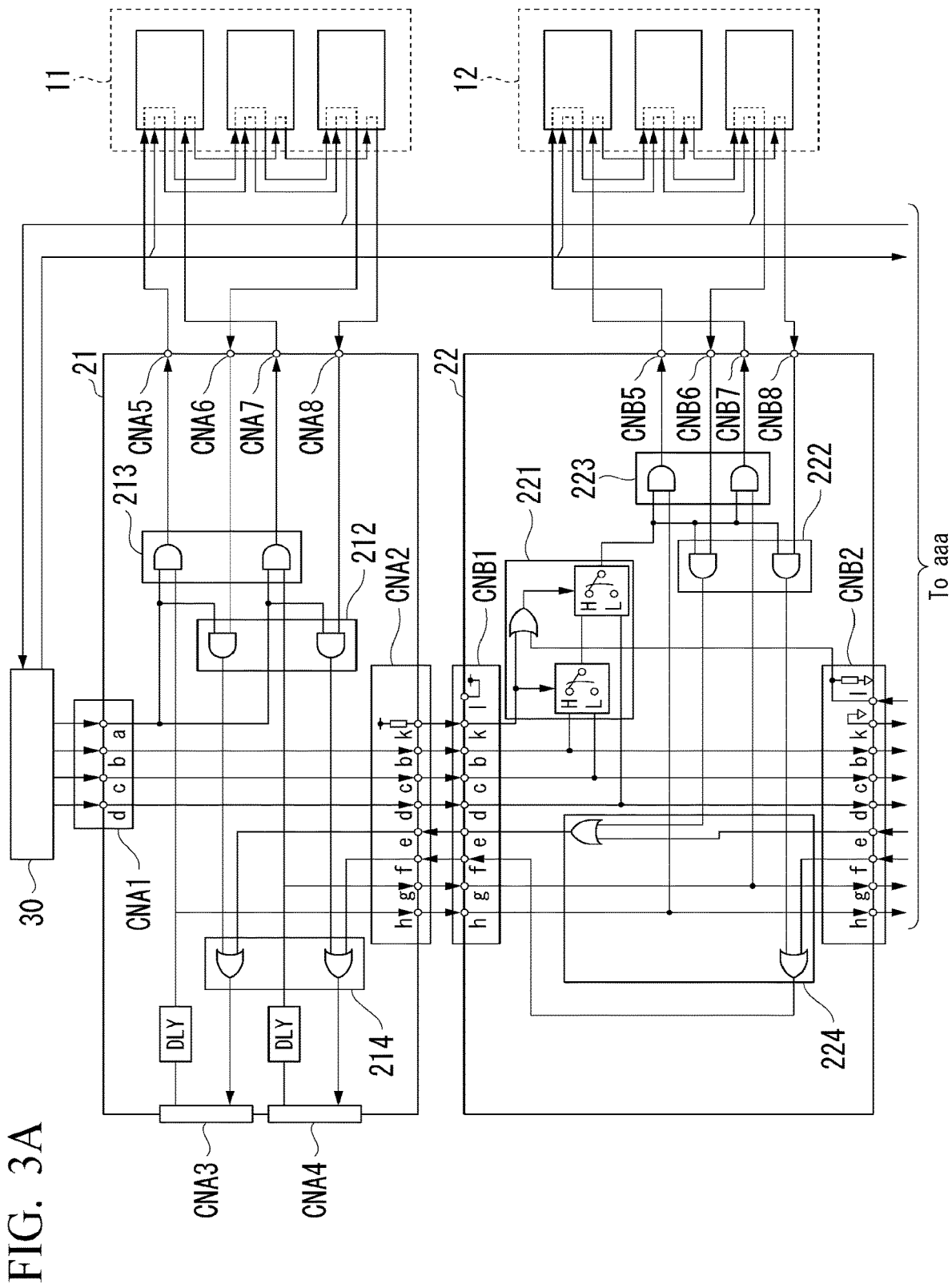
FIG. 3A is a configuration diagram of a relay unit group in the power conversion device according to the embodiment.
Figure 3B:
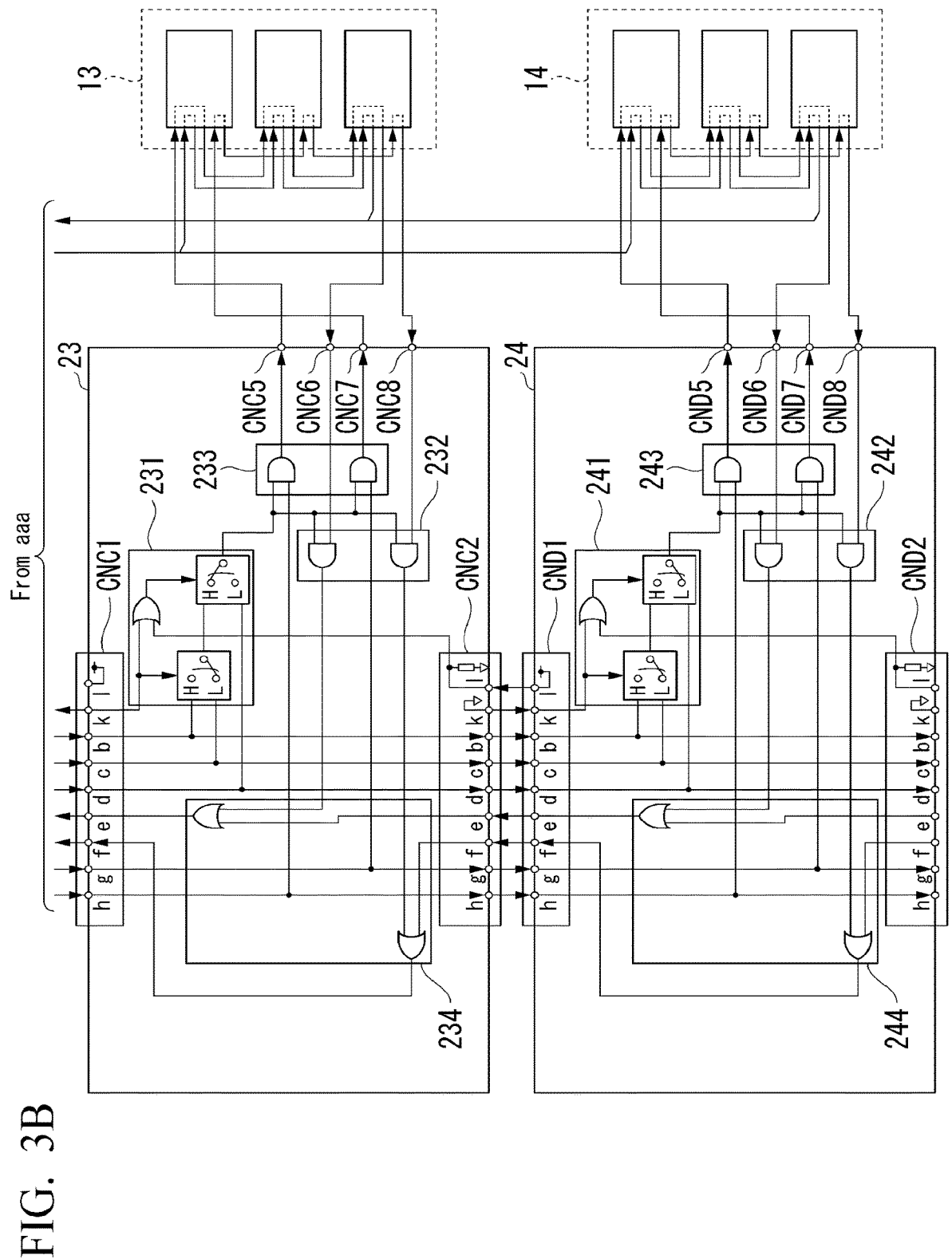
FIG. 3B is a configuration diagram of a relay unit group in the power conversion device according to the embodiment.

Next, the configuration of the relay unit group 20 of the power conversion device 1 will be described with reference to FIGS. 3A and 3B. FIGS. 3A and 3B are configuration diagrams of relay unit groups of the power conversion device 1 according to the embodiment. In FIGS. 3A and 3B, the relay unit group of the power conversion device 1 is illustrated with being divided into two parts. A lower end of FIG. 3A and an upper end of FIG. 3B are connected together.

First, a connection relation of relay units of the power conversion device 1 will be described.

As illustrated in FIG. 3A, a relay unit 21 includes CNA1 to CNA9 as connectors for external connection.

For example, CNA1 includes terminals a to d. CNA1 is connected to the non-safety control unit 30. The use setting signals A to D are respectively supplied to terminals a to d of CNA1 from the non-safety control unit 30.

CNA2 includes terminals b to h, a terminal k, and a power supply terminal pair not illustrated in the drawing. The terminals b to d of CNA2 are respectively connected to terminals b to d of CNA1 inside the relay unit 21. The terminals e and f of CNA2 are connected to inputs of a synthesis gate circuit 214 of the relay unit 21. The terminal g of CNA2 is connected to an input terminal of CNA3 through a first delay circuit (DLY) inside the relay unit 21. The terminal h of CNA2 is connected to an input terminal of CNA4 through a second delay circuit (DLY) inside the relay unit 21. The terminal k of CNA1 is pulled up to a positive power supply voltage inside the relay unit 21 and is set to an H level. A predetermined DC voltage is supplied between terminals of the power supply terminal pair not illustrated in the drawing from the inside of the relay unit 21. CNA2 is connected to CNB1 of the relay unit 22.

An output terminal of CNA3 and an output terminal of CNA4 are connected to outputs of the synthesis gate circuit 214. CNA3 and CNA4 are connected to the safety control unit 40.

CNA5 to CNA8 are connected to the power conversion unit 11. CNA5 and CNA7 transmit safety control signals CMD11 to the power conversion unit 11. For example, each of CNA5 and CNA7 includes an electro-optical converter. Each of CNA6 and CNA8 receives a response signal ANS11 for the safety control signal CMD11 from the power conversion unit 11. For example, each of CNA5 and CNA7 includes a photoelectric converter. CNA5 to CNA8 may be connectors used for transmitting optical signals.

The relay unit 22 includes CNB1, CNB2, and CNB5 to CNB8 as connectors for external connection.

CNB1 includes terminals b to h, terminals k to l, and power supply terminal pair not illustrated in the drawing. CNB1 is connected to CNA2 of the relay unit 21. The terminals b to k of CNB1 are respectively connected to the terminals b to k of CNA2. The use setting signals B to D are supplied to the terminals b to d of CNB1 from the non-safety control unit 30 through the relay unit 21. The terminals e and f of CNB1 are connected to outputs of the synthesis gate circuit 224 of the relay unit 22. The terminals g and h of CNB1 are respectively connected to the terminals g and h of the CNB2 inside the relay unit 22. The terminal k of CNB1 is connected to an input of a selector 221 of the relay unit 22. The terminal 1 of CNB1 is connected to the terminal 1 of CNA2 of the relay unit 21 and is supplied with a positive power supply voltage inside the relay unit 22 and is set to the H level. A circuit (225) supplying the positive power supply voltage to the terminal 1 of this CNB1 is one example of a first voltage setting circuit (referred to as a first voltage setting circuit 225) outputting a first signal of the H level to the relay unit 21 of the upstream side from the relay unit 22.

CNB2 includes terminals b to h, terminals k to 1, and power supply terminal pair not illustrated in the drawing. The terminals b to d of CNB2 are respectively connected to the terminals b to d of CNB1 inside the relay unit 22. The terminals e and f of CNB2 are connected to inputs of the synthesis gate circuit 224 of the relay unit 22. The terminals g and h of CNB2 are respectively connected to the terminals g and h of the CNB1 inside the relay unit 21. The terminal k of CNB2 is connected to a positive power supply inside the relay unit 22 and is set to the H level. CNB2 is connected to CNC1 of the relay unit 23. When the terminal 1 of CNB2 is opened, the terminal 1 of CNB2 becomes an L level in accordance with presence of a pulldown resistor inside the relay unit 22. The terminal 1 of CNB2 has the relay unit 23 being connected thereto and thus is set to the H level. A circuit (226) supplying a voltage of the L level to the terminal k of this CNB2 is one example of a second voltage setting circuit (referred to as a second voltage setting circuit 226) outputting a second signal of the L level to the relay unit 23 of the downstream side from the relay unit 22.

CNB5 to CNB8 are connected to the power conversion unit 12. Each of CNB5 and CNB7 includes a connector used for transmitting a safety control signal CMD12 to the power conversion unit 12. Each of CNB6 and CNB8 includes a connector used for receiving a response signal ANS12 for the safety control signal CMD12 from the power conversion unit 12. CNB5 to CNB8 may be connectors for optical signals.

The relay unit 23 includes CNC1, CNC2, and CNC5 to CNC8 as connectors for external connection.

The relay unit 24 includes CND1, CND2, and CND5 to CND8 as connectors for external connection.

Each of the relay unit 23 and the relay unit 24 has the same configuration as the relay unit 22, and a connection relation of units of the inside of each relay unit is the same as that of the relay unit 22. For example, a safety control signal in the relay unit 23 and a response signal for the safety control signal serve as a safety control signal CMD13 and a response signal ANS13. A safety control signal in the relay unit 24 and a response signal for the safety control signal serve as a safety control signal CMD14 and a response signal ANS14.

Connection relations of the relay unit 23 and the relay unit 24 for other relay units are as below. CNC1 of the relay unit 23 is connected to CNB2 of the relay unit 22. CND1 of the relay unit 24 is connected to CNC2 of the relay unit 22. In addition, CND2 of the relay unit 24 may not be connected. The terminal 1 of CND2 of the relay unit 24 is opened to have no connection to the outside of the relay unit 24 and thus is set to the L level in accordance with a pulldown resistor disposed inside the relay unit 24.

The connection relations between the relay unit 23 and the relay unit 24 and the power conversion units for them are as below. CNC5 to CNC8 of the relay unit 23 are connected to the power conversion unit 13. CND5 to CND8 of the relay unit 24 are connected to the power conversion unit 14.

Next, the configuration of the inside of each relay unit will be described.

For example, the relay unit 21 applied to the A-bank includes an input gate circuit 212, an output gate circuit 213, and a synthesis gate circuit 214. The input gate circuit 212, the output gate circuit 213, and the synthesis gate circuit 214 may be a part of the first logic processing unit 210 described above.

The input gate circuit 212 restricts acquisition of a response signal ANS in the power conversion unit 11 on the basis of the use setting signal A. For example, the input gate circuit 212 restricts acquisition of a response signal ANS in the power conversion unit 11 in a case in which the use setting signal A is in the L level and outputs a response signal ANS of the power conversion unit 11 and outputs the response signal in a case in which the use setting signal A is in the H level.

The output gate circuit 213 restricts output to the power conversion unit 11 of a command signal CMD from the safety control unit 40 on the basis of the use setting signal A. For example, the output gate circuit 213 restricts output of a command signal CMD acquired from the safety control unit 40 to the power conversion unit 11 in a case in which the use setting signal A is in the L level and outputs a command signal CMD acquired from the safety control unit 40 to the power conversion unit 11 in a case in which the use setting signal A is in the H level. For example, in the command signal CMD described above, stop control signals ST01_CMD and ST02_CMD may be included. The stop control signals ST01_CMD and ST02_CMD are one example of command signals CMD configured to be redundant. The stop control signals ST01_CMD and ST02_CMD are respectively transmitted from CNB5 and CNB7 to the power conversion unit 12 as safety control signals.

The synthesis gate circuit 214 synthesizes a response signal ANS11a corresponding to the response signal ANS11 of the power conversion unit 11 that is acquired by the input gate circuit 212 without any restriction and a response signal ANS11b on the downstream side of the power conversion unit 11 and outputs a signal of the result thereof.

For example, as logics of the response signal ANS11, the response signal ANS11a, and the response signal ANS11b, the H level represents an output-permitted state, and the L level represents an output-stop state. When the safety control unit 40 outputs an operation command CMD representing output stop, each power conversion unit 10 that has received the operation command CMD stops the output in accordance with the operation command CMD and outputs a response signal (for example, the response signal ANS11) representing an output stop state. In this state, a response signal of the H level is not present. However, in this state, when a response signal of the H level is present, there is a likelihood of a certain abnormality occurring. By configuring the synthesis gate circuit 214 using a logical sum circuit of a positive logic, presence of a response signal of the H level can be transmitted to the upstream side. A structure of transmission of this response signal is similar also in the relay units 22 to 24 to be described below.

Figure 4:
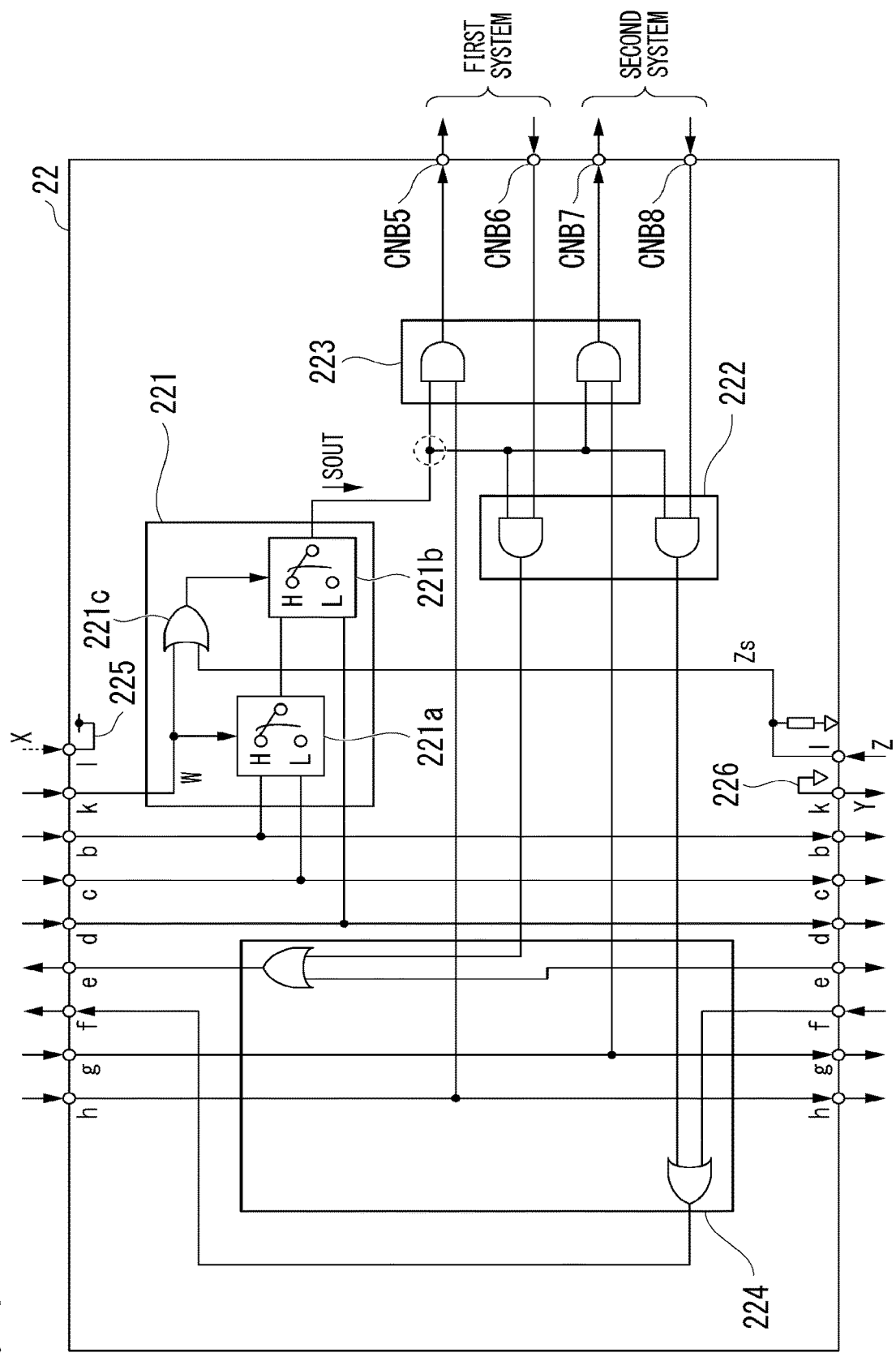
FIG. 4 is a configuration diagram of a relay unit according to an embodiment.

Next, the configuration of the relay unit 22 according to the embodiment will be described with reference to FIG. 4. FIG. 4 is a configuration diagram of the relay unit 22 according to the embodiment.

The relay unit 22 applied to the B bank includes a selector 221, an input gate circuit 222, an output gate circuit 223, and a synthesis gate circuit 224. In addition to those described above, the relay unit 22 further includes a first voltage setting circuit 225 used for outputting a first signal from the relay unit 22 to the upstream side and a second voltage setting circuit 226 used for outputting a second signal from the relay unit 22 to the downstream side thereof. For example, the selector 221, the input gate circuit 222, the output gate circuit 223, and the synthesis gate circuit 224 may be a part of the second logic processing unit 220.

The selector 221 selects one of use setting signals B to D (a first use setting signal to a third use setting signal) on the basis of a logic value of a W signal (a second signal) and a logic value of a Z signal (a first signal) and generates a use setting signal SOUT.

For example, the selector 221 may be configured as below.

The selector 221 includes selectors 221a and 221b and an OR gate circuit 221c.

A use setting signal B of a B-bank (B bank) and a use setting signal C of a C-bank (C bank) are respectively supplied to a first input (H) and a second input (L) of the selector 221a. A second signal (W) output by the relay unit 21 of a high rank is supplied to a control terminal thereof. The selector 221a outputs the use setting signal B of the B-bank in a case in which the second signal (W) described above is in the H level (high level) and outputs the use setting signal C of the C-bank in a case in which the second signal (W) is in the L level (low level). This selector 221a is configured to select one of the use setting signal B (a first use setting signal) and a use setting signal C (a second use setting signal) on the basis of a logic value of the second signal (W) as described above.

An output signal of the selector 221a and a use setting signal D of a D-bank are supplied to a first input (H) and a second input (L) of the selector 221b. An output of the OR gate circuit 221c is connected to a control terminal thereof.

A second signal (W) output by the relay unit 21 of a high rank is supplied to a first input of the OR gate circuit 221c. A signal (Zs) of a logic value of one of a logic value of a first signal (Z) output by the relay unit 23 of the downstream side and a logic value of a third signal generated in the relay unit 22 is supplied to a second input of the OR gate circuit 221c. In other words, a logic sum of a signal (Zs) of a logic value of one of the logic value of the first signal (Z) output by the relay unit 23 of the downstream side and the logic value of the third signal generated in the relay unit 22 and the second signal (W) output by the relay unit 21 of the high rank is configured to be supplied to a control terminal of the selector 221b.

In addition, since the relay unit 23 of the downstream side is connected to the relay unit 22, the H level corresponding to the logic value of the first signal (Z) output by the relay unit 23 corresponding to the former unit described above is supplied to the control terminal of the selector 221b. The selector 221b outputs an output signal of the selector 221a in a case in which the first signal (Z) is in the H level and outputs the use setting signal D of the D-bank in a case in which the second signal is in the L level. This selector 221b, as described above, selects one of a result of selection using the selector 221a and the use setting signal D (the third use setting signal) on the basis of an operation result of a logic sum based on one of the logic value of the first signal (Z) and the logic value of the third signal and the logic value of the second signal (W).

In this way, the selector 221 is formed to select one of the use setting signal B to the use setting signal D on the basis of the logic value of the first signal (Z) and the logic value of the second signal (W).

The input gate circuit 222 restricts acquisition of a response signal ANS12a corresponding to the response signal ANS12 in the power conversion unit 12 on the basis of a use setting signal SOUT representing a result of selection using the selector 221. For example, the input gate circuit 222 restricts acquisition of the response signal ANS12a of the power conversion unit 12 in a case in which the use setting signal SOUT is in the L level and acquires and outputs the response signal ANS12a of the power conversion unit 12 in a case in which the use setting signal is in the H level.

The output gate circuit 223 restricts relay of a command signal CMD supplied from the safety control unit 40 to the power conversion unit 12 on the basis of a use setting signal SOUT representing the result of selection using the selector 221. For example, the output gate circuit 223 restricts output of a command signal CMD supplied from the safety control unit 40 to the power conversion unit 12 in a case in which the use setting signal SOUT is in the L level and outputs the command signal CMD supplied from the safety control unit 40 to the power conversion unit 12 in a case in which the use setting signal is in the H level. In the command signal CMD described above, stop control signals ST01_CMD and ST02_CMD may be included.

The synthesis gate circuit 224, without being restricted by the input gate circuit 222, synthesizes the response signal ANS12a of the power conversion unit 12 (its own power conversion unit relating to its own second relay unit) that has been acquired and a response signal ANS12b of the downstream side of the power conversion unit 12 and outputs a signal of the result thereof.

As illustrated in FIG. 3B, the relay unit 23 applied to the C-bank includes a selector 231, an input gate circuit 232, an output gate circuit 233, and a synthesis gate circuit 234.

The relay unit 24 applied to the D-bank includes a selector 241, an input gate circuit 242, an output gate circuit 243, and a synthesis gate circuit 244.

The relay unit 23 and the relay unit 24 are units that are the same as the relay unit 22 described above. Each of the relay unit 23 and the relay unit 24 has an arrangement order different from that of the relay unit 22 described above, and an operation of each of the selector 231 and the selector 241 relating to selection of a bank is different from that of the selector 221.

Selection of a bank using the relay units 22 to 24 will be described with reference to FIGS. 5 and 6. FIGS. 5 and 6 are diagrams illustrating selection of a bank according to an embodiment. A truth table illustrated in FIG. 5 represents relations between setting signals of the relay units 22 to 24 and output signals of the selectors 221, 231, and 241.

"W", "X", "Y", and "Z" representing setting signals and an output signal "SOUT" in the table correspond to the signals illustrated in FIG. 4. States of the signals are indicated using two values of an H level and an L level.

"X" and "Y" are respectively fixed to the H level and the L level. These are signals that contribute to determination of selection of banks in relay units of adjacent banks and do not contribute to determination of selection of a bank in its own relay unit (the relay unit 22). Thus, in its own unit (the relay unit 22), "W" and "Z" described above are used as input signals of the selectors 221, 231, and 241. In this truth table, conditions corresponding to the B-bank to the D-bank are illustrated in order from the top.

The output signal "SOUT" is an output signal of each of the selectors 221, 231, and 241. In case of matching with each of the B-bank to the D-bank, the H level is selected.

From the truth table illustrated in FIG. 5 described above, ranges used for input signals of the selectors 221, 231, and 241 are extracted and are arranged again in FIG. 6.

For example, a logic value of the signal (Y) output by the relay unit 21 (a first relay unit), that is, a logic value of the signal W of the B-bank relating to the second signal, is a value of a first logic (for example, "1" corresponding to the H level). In contrast to this, a logic value of the signal (Y) output by the relay units 22 to 24 (a second relay unit), that is, a logic value of the signal W of the B-bank relating to the second signal, is a value of a second logic (for example, "0" corresponding to the L level).

For example, the relay unit 24 positioned in the D-bank positioned furthest downstream generates a third signal of which a value of the second logic is "0" in the relay unit 24. The relay unit 24 uses a value "0" of the second logic as a logic value of the third signal.

For this, the relay units 22 and 23 acquired by excluding the relay unit 24 disposed on a furthest downstream side from among the relay units 22 to 24 (a second relay unit) are different from the relay unit 24 described above. The relay unit 23 uses a first signal (Z) of a logic value "1" output by the relay unit 24 of the downstream side. The relay unit 22 uses a first signal (Z) of a logic value "1" output by the relay unit 23 of the downstream side. In addition, the logic value of the first signal (Z) and the logic value of the third signal generated in each of the relay units 22 to 24 have a complementary relationship.

As can be understood from this truth table illustrated in FIG. 6, a relay unit assigned to each bank can identify the position of its own relay unit (the position of its own bank) by receiving a signal from a relay unit of an adjacent bank adjacent to its own bank.

As described above, in a predetermined case described below, each of the relay units 22 to 24 transmits a response signal ANS of its own power conversion unit relating to its own relay unit to the upstream side of its own relay unit in accordance with a use setting signal of each bank. Each of the relay units 22 to 24 transmits a response signal ANS of the downstream side of its own power conversion unit to the upstream side of its own power conversion unit without using the predetermined case. In addition, the predetermined case described above, for example, may be a case in which a logic value of one of a logic value of the first signal (Z) output by a relay unit of the downstream side (a second relay unit) and a logic value of the third signal generated in its own relay unit and a logic value of the second signal output by the upstream side are predetermined values determined in accordance with a connection order of relay units.

In addition, each of the relay units 22 to 24 acquires a command signal CMD of the upstream side of its own relay unit as a signal for its own power conversion unit relating to the relay unit described above from among the power conversion units 12 to 14 in accordance with use setting signals B to D of banks of the B-bank (B bank) to the D-bank (D bank). Each of the relay units 22 to 24 supplies this signal to its own power conversion unit corresponding to its own relay unit.

When the use setting signals A to D of each bank are focused, the relay unit 21 receives the use setting signals A to D of each bank from the non-safety control unit 30 that is an external device of the relay unit 21 and relays the use setting signals B to D to the downstream side thereof. The relay units 22 to 24 receive use setting signals B to D of each bank from the upstream side and relay the use setting signals to the downstream side. In addition, the relay unit 21 may be configured to use only the use setting signal A of each bank inside thereof. In contrast to this, no use setting signal A is supplied to the relay units 22 to 24.

The command signal CMD from the safety control unit 40 is configured to be redundant.

The relay units 21 to 24 (a first relay unit and a second relay unit) relay respective command signals CMD used for functional safety control that are configured to be redundant to the downstream side.

In a case in which a predetermined condition set in accordance with a connection order is satisfied, the relay units 21 to 24 relay command signals CMD that are configured to be redundant to one of the power conversion units 11 to 14 associated therewith. For example, in accordance with satisfaction of the predetermined condition described above, a corresponding bank is designated as a bank to be used using the use setting signal.

For example, the use setting signal includes a use setting signal B (a first use setting signal) to a use setting signal D (a third use setting signal) used for selecting relay units of first to third banks from the upstream side in the relay units 22 to 24.

Figure 7:
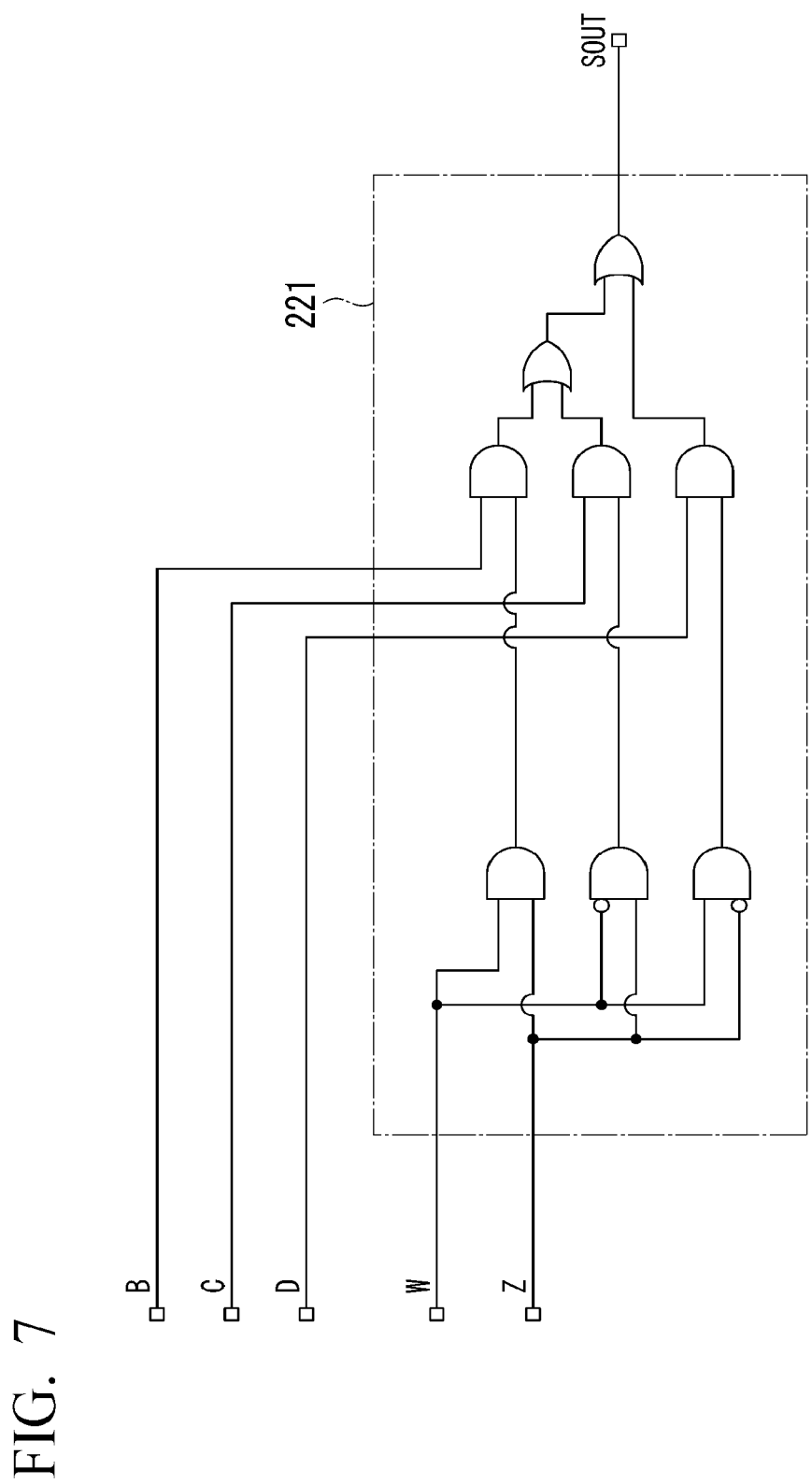
FIG. 7 is a configuration diagram of a selection unit according to an embodiment.

FIG. 7 is a configuration diagram of a selection unit according to an embodiment.

The selector 221 can be expanded into a combination circuit of two input gate circuits. In case of the number of stages and a circuit scale of this gate, it can be housed in a semiconductor device such as one PLD. The circuit illustrated in FIG. 7 is an example and is not limited thereto.

Next, the functional safety control according to the embodiment will be described.

A command signal CMD of the functional safety control is supplied to a power conversion unit of an activated bank. For example, the non-safety control unit 30 outputs use setting signals A to D of each bank to be activated independently from the functional safety control. The relay units (21 to 24) of each bank identify states activated using the use setting signals A to D corresponding to the bank.

When the safety control unit 40 supplies a command signal CMD to the relay unit 21 for the functional safety control, the relay units 21 to 24 relays this command signal CMD in order. The relay units 21 to 24 of the activated bank respectively relay the command signal CMD to the power conversion units 11 to 14. The power conversion unit 10 to which the command signal CMD is supplied outputs an electric power. The power conversion unit 10 to which the command signal CMD has been supplied replies to the relay unit with a response signal ANS for this.

In addition, each relay unit collects a response signal ANS from the power conversion unit of each bank that is activated, logically synthesizes these response signals, and relays a synthesized signal to the upstream side. When the response signal ANS that is a result collected and relayed by each relay unit is in the L level, a state in which the functional safety control normally functions is determined. When the response signal ANS is in the H level, it may be determined that a state in which the functional safety control does not normally function has occurred.

For example, when any one of relay units collects a response signal ANS of the H level and relays the response signal, a final response signal ANS supplied to the safety control unit 40 becomes the H level. In a state in which output stop is notified using a command signal CMD, when a response signal ANS that is a result of collection is in the H level, the safety control unit 40 identifies a state in which a power conversion unit, in which functional safety control does not normally function, is included in power conversion units that have supplied the command signal CMD. The safety control unit that has detected such a state performs switching of a range in which the safety control unit 40 operates in cooperation with the non-safety control unit 30 and sets a state in which a response signal ANS of a result of collection becomes the L level. In accordance with this, it is identified that there is a possibility of a disorder occurring in a power conversion unit excluded from an operation target.

Although a state in which the functional safety control does not normally function is not a proper state, there is a low possibility of this causing a heavy disorder. Thus, in the order as described above, a power conversion unit in which the functional safety control does not normally function is switched from the currently-used system to the standby system and is set as a maintenance target. By taking such a handling method, the system can be recovered to a required operation state without stopping the entire system.

In addition, the relay units 21 to 24 of a bank that has not been selected to be operated do not relay a command signal CMD to each corresponding power conversion unit. The power conversion units to which the command signal CMD has not been supplied is controlled such that they do not output an electric power.

Although the description of the operation presented above focuses on function safety, switching between a currently-used system and a standby system for the purpose of avoiding a disorder and the like may be performed independently from this.

According to at least one of the embodiments described above, a power conversion device includes a first relay unit, one or more second relay units, and a safety control unit. The first relay unit described above transmits a response signal ANS supplied from a first power conversion unit described above and a response signal ANS of a downstream side of its own first relay unit to an upstream side in a first bank associated with the first power conversion unit. The one or more second relay units described above transmit a response signal supplied from one second power conversion unit among one or more second power conversion units and a response signal ANS of a downstream side of the one second relay unit described above to an upstream side of the one second relay unit described above in one or more second banks respectively associated with the one or more second power conversion units. The safety control unit described above is disposed on an upstream side of the first relay unit described above and performs functional safety control of the first power conversion unit described above and the one or more second power conversion units described above by transmitting a control command for functional safety control to the first relay unit described above and thus monitors a state of a functional safety control of the first power conversion unit described above and a state of functional safety control of the one or more second power conversion units described above. In accordance with this, information representing states of functional safety control of a plurality of power conversion units that are configured to be redundant can be collected using a simple and easy configuration.

At least a part of the non-safety control unit 30 and the safety control unit 40 described above may be realized by a software functional unit functioning in accordance with a processor such as a CPU or the like executing a program, or all of them may be realized by a hardware functional unit such as an LSI or the like.

Although several embodiments of the present invention have been described, such embodiments are presented as examples and are not intended to limit the scope of the invention. These embodiments can be performed in various other forms, and various omissions, substitutions, and changes can be made in a range not departing from the concept of the invention. These embodiments and modifications thereof are included in inventions described in the claims and a range equivalent thereto similarly to a case in which they are included in the scope and the concept of the invention.

For example, instead of the configuration of the three-level type (FIG. 2A) described above, a configuration of a five-level type (FIG. 2B) may be applied as well.

REFERENCE SIGNS LIST

1 Power conversion device
10, 11, 12, 13, 14 Power conversion unit

20 Relay unit group
21, 22, 23, 24 Relay unit
30 Non-safety control unit (non-safety control part)
40 Safety control unit 40 (safety control part)
221, 231, 241 Selector
212, 222, 232, 242 Input gate circuit
213, 223, 233, 243 Output gate circuit
214, 224, 234, 244 OR gate circuit (synthesis gate circuit)

The invention claimed is:

1. A power conversion device in which a plurality of power conversion units are configured to be divided into a plurality of banks, and operation states of the power conversion units are controlled in units of the banks, the power conversion device comprising:
a first relay unit configured to transmit a response signal supplied from a first power conversion unit and a response signal of a downstream side of its own first relay unit to an upstream side in a first bank associated with the first power conversion unit;
one or more second relay units configured to transmit a response signal supplied from one second power conversion unit among one or more second power conversion units and a response signal of a downstream side of the one second relay unit to an upstream side of the one second relay unit in one or more second banks associated with the one or more second power conversion units; and
a safety control unit disposed on an upstream side of the first relay unit and configured to perform a functional safety control of the first power conversion unit and the functional safety control of the one or more second power conversion units by transmitting a command signal including a control command for the functional safety control to the first relay unit and thus monitor a state of the functional safety control of the first power conversion unit and states of the functional safety control of the one or more second power conversion units.

2. The power conversion device according to claim 1, wherein the safety control unit, the first relay unit, and the one or more second relay units have a connection order based on the mentioned order defined with the safety control unit defined as an upstream side and are mutually electrically connected in accordance with the connection order,
wherein each second relay unit among the one or more second relay units includes a first voltage setting circuit outputting a first signal from its own second relay unit to an upstream side and a second voltage setting circuit outputting a second signal from its own second relay unit to a downstream side,
wherein a logic value of one of a logic value of the first signal output by the second relay unit of the downstream side among the one or more second relay units and a logic value of a third signal generated in its own second relay unit and a logic value of the second signal output by the upstream side are determined in accordance with the connection order, and
wherein each second relay unit transmits a response signal generated by its own power conversion unit relating to its second own relay unit in accordance with a use setting signal of each second bank to an upstream side of its own second relay unit and transmits a response signal of a downstream side of its own power conversion unit to an upstream side of its own power conversion unit.

3. The power conversion device according to claim 2, wherein the first relay unit acquire a command signal from the safety control unit and supplies the command signal to the first power conversion unit, and
wherein, in a case in which each of the logic value of one of the logic value of the first signal output by the second relay unit of the downstream side and a logic value of the third signal generated in its own second relay unit and a logic value of the second signal output on the upstream side is a predetermined value determined in accordance with the connection order of the second relay units, each of the one or more second relay units acquires a command signal from the upstream side of its own second relay unit as a signal for its own power conversion unit relating to its own second relay unit in accordance with the use setting signal of each second bank and supplies the command signal to its own power conversion unit.

4. The power conversion device according to claim 2, wherein the logic value of the first signal and the logic value of the third signal generated in its own second relay unit have a mutually complementary relationship.

5. The power conversion device according to claim 2, wherein a logic value of the second signal output by the first relay unit is a first logic value H,
wherein a logic value of the second signal output by the second relay unit is a second logic value L,
wherein the second relay unit disposed on a furthest downstream side among the one or more second relay units generates a third signal of the second logic value L in its own second relay unit, and
wherein the second relay units acquired by excluding the second relay unit disposed on a furthest downstream side among the two or more second relay units use the first signal of the first logic value H output by the second relay unit of the downstream side.

6. The power conversion device according to claim 2, wherein the first relay unit receives a use setting signal of each bank from an external device of the first relay unit and relays the use setting signal to the downstream side, and
wherein the second relay unit receives a use setting signal of each bank from the upstream side and relays the use setting signal to the downstream side.

7. The power conversion device according to claim 1, wherein the command signal from the safety control unit is configured to be redundant, and
wherein each of the first relay unit and the second relay units relays the command signal that is configured to be redundant to the downstream side.

8. The power conversion device according to claim 7, wherein, in a case in which a predetermined condition is satisfied, the first relay unit relays the command signal that is configured to be redundant to the first power conversion unit, and
wherein, in a case in which the predetermined condition is satisfied, the second relay unit relays the command signal that is configured to be redundant to the second power conversion unit.

9. The power conversion device according to claim 2, wherein the use setting signal includes a first use setting signal to a third use setting signal used for respectively selecting the second relay unit positioned first to the second relay unit positioned third from the upstream side.

10. The power conversion device according to claim 9, wherein each of the one or more second relay units includes:
a selector configured to select one of the first use setting signal to the third use setting signal on the basis of the logic value of the first signal and the logic value of the second signal in its own second relay unit;

an input gate circuit configured to restrict acquisition of the response signal on the basis of a result of selection using the selector;

an output gate circuit configured to restrict relay of the control command on the basis of the result of the selection using the selector; and a synthesis gate circuit configured to output a signal acquired by synthesizing a response signal of its own power conversion unit relating to its own second relay unit acquired without being restricted by the input gate circuit and a response signal of the downstream side of its own power conversion unit.

11. The power conversion device according to claim 9, further comprising:

a first selector configured to select one of the first use setting signal and the second use setting signal on the basis of the logic value of the second signal;

a second selector configured to select one of a result of selection using the first selector and the third use setting signal on the basis of a logical operation result based on one of the logic value of the first signal and the logic value of the third signal and the logic value of the second signal;

an input gate circuit configured to restrict acquisition of the response signal on the basis of a result of selection using the second selector;

an output gate circuit configured to restrict an output of a command signal from the safety control unit on the basis of the result of the selection using the second selector; and a synthesis gate circuit configured to output a signal acquired by synthesizing a response signal of its own power conversion unit relating to its own second relay unit acquired without being restricted by the input gate circuit and a response signal of the downstream side of its own power conversion unit.

12. The power conversion device according to claim 1, further comprising:

the first power conversion unit;

the one or more second power conversion units; and a non-safety control unit configured to perform a capacity redundancy control of each power conversion unit by adjusting power conversion amounts of the first power conversion unit and the one or more second power conversion units.

13. The power conversion device according to claim 1, further comprising:

the first power conversion unit;

the one or more second power conversion units; and a non-safety control unit configured to perform a standby redundancy control of power conversion units by outputting a use setting signal used for selecting a power conversion unit to be activated from among the first power conversion unit and the one or more second power conversion units.

\* \* \* \* \*